United States Patent [19]

Takarada et al.

[11] Patent Number: 5,550,270

[45] Date of Patent: Aug. 27, 1996

[54] ORGANOPOLYSILOXANES AND PROCESS OF MAKING

[75] Inventors: Mitsuhiro Takarada; Yoshinori Shimazaki, both of Usui-gun, Japan

[73] Assignee: Shin-Etsu Chemical Co., Ltd., Tokyo, Japan

[21] Appl. No.: 461,742

[22] Filed: Jun. 5, 1995

[30] Foreign Application Priority Data

Sep. 6, 1994 [JP] Japan ................................. 6-151448

[51] Int. Cl.$^6$ ................................................. C07F 7/08
[52] U.S. Cl. ................................................. 556/440
[58] Field of Search ......................................... 556/440

[56] References Cited

U.S. PATENT DOCUMENTS 3,234,252  2/1966  Pater ........................... 556/440
5,049,617  9/1991  Yoshioka et al. ............... 556/440 X
5,256,754  10/1993  Takarada et al. ............... 556/440 X

*Primary Examiner*—Paul F. Shaver
*Attorney, Agent, or Firm*—Millen, White, Zelano, & Branigan, P.C.

[57] ABSTRACT

Novel organopolysiloxanes have the average compositional formula (1):

$$X_aR^1_{3-a}SiO(SiO)_b(SiO)_c(SiO)_dSiR^1_{3-a}X_a \quad (1)$$

with side groups $R^1, R^1, R^1$ and $R^1, X, Y$ wherein X is a monovalent substituent containing a polyoxyethylene group, Y is a 3-(meth)acryloxypropyl group, $R^1$ is a $C_{1-6}$ alkyl group or phenyl group, $a=0$ or $1$, $1 \leq b \leq 20$, $0 \leq c \leq 10$, $1 \leq d \leq 10$, and $1 \leq a+c \leq 10$. They are prepared by effecting addition reaction of an aliphatic unsaturated compound containing a polyoxyethylene group to corresponding organohydrogenpolysiloxanes.

3 Claims, 2 Drawing Sheets

ORGANOPOLYSILOXANES AND PROCESS OF MAKING

BACKGROUND OF THE INVENTION

1. Field of the Invention

This invention relates to novel organopolysiloxanes suitable for use as modifiers for organic resins as well as a process for preparing the same.

2. Prior Art

From the past, organopolysiloxanes having an organic functional group have been widely used as resin modifiers in the fields of paint, molding materials, medical materials, cosmetic materials and various coating materials. These modifiers are effective for imparting heat resistance, weather resistance, releasability, moldability and thermal shock resistance to organic resins.

Known organopolysiloxanes having an organic functional group include dimethylpolysiloxanes having an alcoholic hydroxyl group at either end (see JP-B 8718/1979), dimethylpolysiloxanes having a functional group at either end (see JP-A 217515/1983 and 123502/1984), methylpolysiloxanes having a functional group in a side chain (see JP-B 18968/1986 and 28880/1986), and methylphenylpolysiloxanes containing alcoholic hydroxyl groups in a side chain and at both ends. There were recently proposed organopolysiloxanes containing distinct functional groups such as (meth)acryl, epoxy and alcoholic hydroxyl groups in a molecule (see JP-A 294962/1990, 294963/1990 and 168126/1992).

There is still a demand for an organopolysiloxane which is more effective as a modifier for organic resins.

SUMMARY OF THE INVENTION

Searching for an organopolysiloxane which is more effective as a resin modifier, we have found that an organopolysiloxane of the following average compositional formula (1) is obtained by adding an aliphatic unsaturated compound containing a polyoxyethylene group to a Si—H group of an organohydrogenpolysiloxane of the following average compositional formula (2).

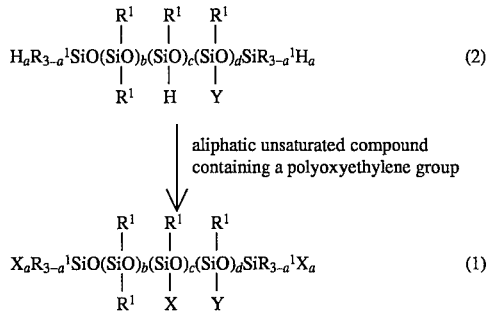

In the formulae, X is a monovalent substituent containing a polyoxyethylene group, Y is a 3-acryloxypropyl or 3-methacryloxypropyl group, $R^1$ is an alkyl group having 1 to 6 carbon atoms or phenyl group, letters a, b, c, and d are positive numbers in the range: $a=0$ or 1, $1 \leq b \leq 20$, $0 \leq c \leq 10$, $1 \leq d \leq 10$, and $1 \leq a+c \leq 10$.

Since the organopolysiloxane of formula (1) has both a (meth)acryl group and a polyoxyethylene group in a molecule, the polysiloxane can be introduced into a copolymer resin by copolymerizing the (meth)acryl group with another radical polymerizable monomer. The polyoxyethylene group imparts lubricity, water solubility and stain resistance to the copolymer resin. Advantageously the organopolysiloxane of formula (1) is emulsion polymerizable with another radical polymerizable monomer without a need for emulsifiers.

Accordingly, the present invention provides a novel organopolysiloxane of formula (1) defined above. According to the process of the invention, the organopolysiloxane of formula (1) is prepared by adding a compound containing both a polyoxyethylene group and an aliphatic unsaturated group to a Si—H group of an organohydrogenpolysiloxane of formula (2).

BEST MODE FOR CARRYING OUT THE INVENTION

Figure 1:
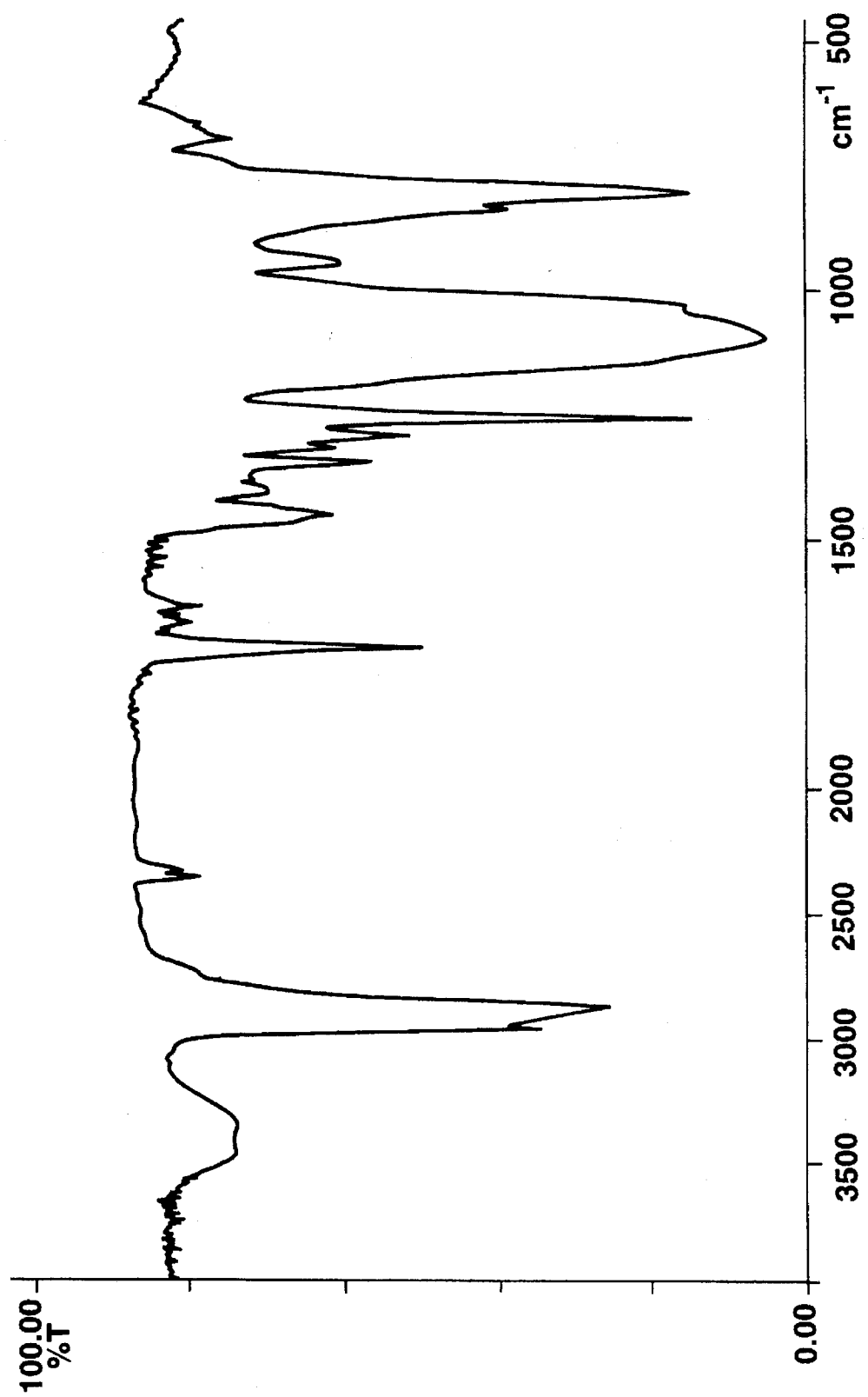
FIG. 1 is an IR spectrum of the organopolysiloxane obtained in Example 1.

The organopolysiloxane of the present invention has the following average compositional formula (1):

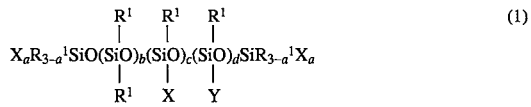

wherein X is a monovalent substituent containing a polyoxyethylene group, Y is a 3-(meth)acryloxypropyl group, $R^1$ is an alkyl group having 1 to 6 carbon atoms or phenyl group, letters a, b, c, and d are 0 or positive numbers in the range: $a=0$ or 1, $1 \leq b \leq 20$, $0 \leq c \leq 10$, $1 \leq d \leq 10$, and $1 \leq a+c \leq 10$.

The organopolysiloxanes of formula (1) wherein a is equal to 0 or 1 and c is equal to 0 or 1 or more encompass those organopolysiloxanes of the following formulae (1a), (1b), and (1c).

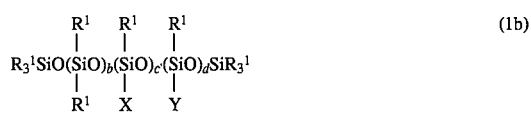

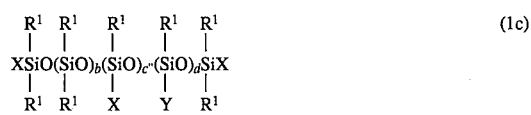

Note that c' and c" are in the range: $1 \leq c' \leq 10$ and $1 \leq c'' \leq 8$.

More illustratively, $R^1$ is an alkyl group having 1 to 6 carbon atoms such as methyl, ethyl, and propyl or a phenyl group. Methyl and phenyl groups are preferred as $R^1$ from a commercial point of view. In particular, using a mixture of methyl and phenyl groups as $R^1$ is desirable for the purpose of improving reactivity and compatibility with organic resins. For example, the organopolysiloxane may have a dimethylsiloxane unit and a diphenylsiloxane or methylphenylsiloxane unit in its backbone. The $R^1$ groups preferably consist of 20 to 98 mol %, especially 50 to 90 mol % of methyl and 80 to 2 mol %, especially 50 to 10 mol % of phenyl.

X is a monovalent substituent containing a polyoxyethylene group, preferably a substituent represented by $-C_3H_6O(CH_2CH_2O)_nR^2$ wherein $R^2$ is a hydrogen atom or an alkyl group having 1 to 6 carbon atoms and letter n is a positive number of 5 to 30.

Letters b, c and d are numbers in the above-defined range. If the length of siloxane is too long, that is, if letters b, c and d exceed their upper limit, the siloxane would become too viscous, difficult to handle and less compatible with organic resins.

The organopolysiloxane of formula (1) can be obtained by effecting addition reaction or hydrosilylation reaction between a compound containing both a polyoxyethylene group and an aliphatic unsaturated group and an organohydrogenpolysiloxane of the following average compositional formula (2):

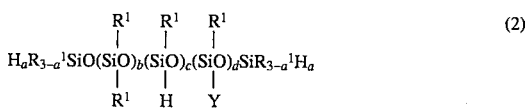

wherein $R^1$, Y, a, b, c, and d are as defined above. In this addition reaction, a Si—H group of the organohydrogenpolysiloxane of formula (2) adds to an aliphatic unsaturated group of the aliphatic unsaturated compound containing a polyoxyethylene group.

The organohydrogenpolysiloxanes of formula (2) encompass the organohydrogenpolysiloxanes of the following formula (2a), (2b), and (2c) corresponding to the organopolysiloxanes of formulae (1a), (1b), and (1c). By reacting the aliphatic unsaturated compound containing a polyoxyethylene group with the organohydrogenpolysiloxanes of formula (2a), (2b), and (2c), there are obtained the organopolysiloxanes of formulae (1a), (1b), and (1c), respectively.

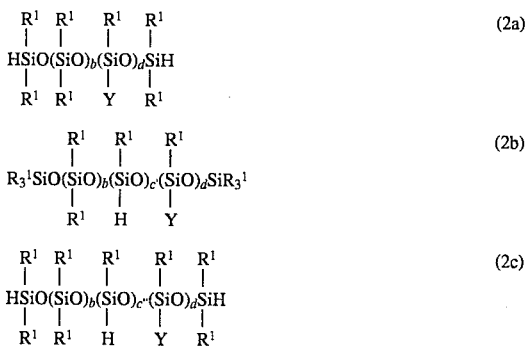

Note that c' and c" are as defined above.

The organohydrogenpolysiloxanes of formula (2a) are readily prepared by effecting equilibration reaction among compounds of the following formulae (4), (5) and (6) according to JP-A 169589/1992 or by effecting hydrolysis and equilibration reaction among compounds of the following formulae (4), (5) and (7) or formulae (4), (6) and (8).

Note that $R^1$ is an alkyl group having 1 to 6 carbon atoms or phenyl group, $R^3$ is a hydrogen atom or methyl group, $R^4$ is a methyl or ethyl group, and letters x and y are integers of 3 to 10.

The organohydrogenpolysiloxanes of formula (2b) are prepared by effecting equilibration reaction among compounds of formulae (9), (6) and (10). Alternatively, they are prepared by effecting hydrolysis and equilibration reaction of compounds of formulae (9), (6) and (8) with (10) or formulae (9) and (7) with (10) or formulae (9), (10) and (7) with (8).

Note that $R^1$ is as defined above, letter m is an integer of 0 to 100, and z is an integer of 3 to 10.

The organohydrogenpolysiloxanes of formula (2c) are readily prepared by effecting equilibration reaction of compounds of formulae (4), (5) and (6) with (10). Alternatively, they are prepared by effecting hydrolysis and equilibration reaction of compounds of formulae (4), (5) and (7) with (10) or formulae (4), (6) and (8) with (10).

Particularly when the compound of formula (8) used in the above-mentioned hydrolysis and equilibration reaction is $(C_6H_5)_2Si(OR^4)_2$, $(C_6H_5)(CH_3)Si(OR^4)_2$, etc., there are obtained radical polymerizable macromers which are highly compatible with organic resins and thus find a wider range of application.

As mentioned above, organohydrogenpolysiloxanes of formulae (2a), (2b) and (2c) are readily prepared by effecting equilibration reaction of tetraalkyldisiloxanes, tetraalkylcyclotetrasiloxanes, (meth)acryloxypropylalkyldialkoxysilanes or hydrolysates thereof, and various cyclic or chain polysiloxanes in the presence of sulfuric acid or sulfonic acids. Several illustrative, non-limiting examples of the organohydrogenpolysiloxane are given below. Note that Me is methyl, Ph is phenyl, Y is a 3-acryloxypropyl or 3-methacryloxypropyl group.

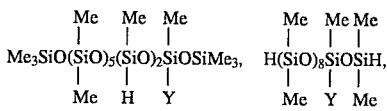

-continued

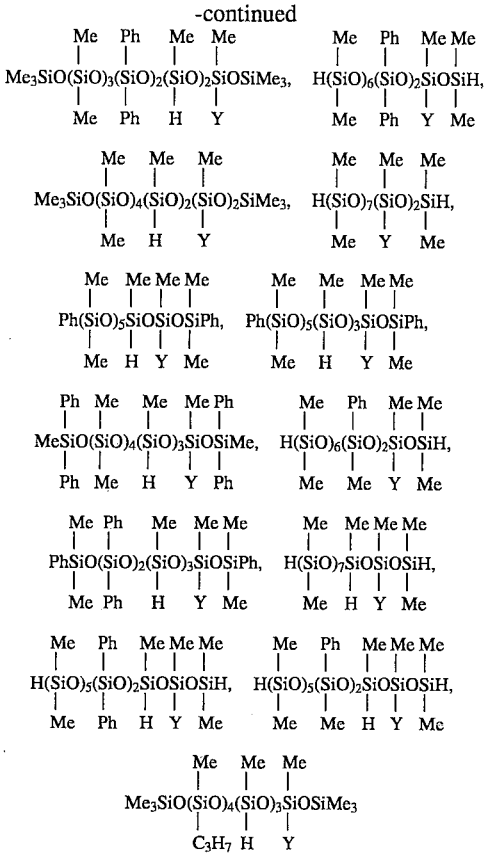

On the other hand, the aliphatic unsaturated compound containing a polyoxyethylene group which is subject to addition reaction to the (meth)acryloxypropyl group-containing organohydrogenpolysiloxane is not particularly limited as long as it contains both a polyoxyethylene group and an aliphatic unsaturated group. Preferred are compounds of the following general formula (3):

$$CH_2=CHCH_2O(CH_2CH_2O)_n R^2 \qquad (3)$$

wherein $R^2$ is a hydrogen atom or an alkyl group having 1 to 6 carbon atoms and letter n is a positive number of 5 to 30.

From the standpoint of reactivity, $R^2$ is preferably a hydrogen atom. If n is less than 5, undesirably solubility or dispersibility in water becomes poor. If n exceeds 30, the polyether moiety becomes too large, inhibiting the organopolysiloxane from exerting its inherent properties. More preferably n is a number of 7 to 20 since a proper balance of hydrophilic and hydrophobic properties is adjustable.

The above-mentioned addition reaction or hydrosilylation reaction is preferably carried out in the presence of a platinum catalyst. Any of platinum catalysts commonly used in conventional hydrosilylation reaction may be used. For commercial manufacture, chloroplatinic acid and neutral platinum catalysts having vinyl-containing siloxane coordinated therewith are preferred. The platinum catalyst is added in a catalytic amount, typically about 2 to 400 ppm of platinum based on the organohydrogenpolysiloxane. The hydrosilylation reaction conditions include a temperature of about 60° to 120° C. and a time of about 2 to 8 hours although they may be properly selected without undue experimentation.

For adjusting the viscosity of the reaction system and reaction temperature, reaction may be carried out in the presence of aromatic hydrocarbon solvents such as benzene, toluene, and xylene and aliphatic hydrocarbon solvents such as hexane, heptane, and octane. Where neutral platinum catalysts having vinyl siloxane coordinated therewith are used, lower alcohols such as ethanol, isopropyl alcohol and isobutanol may be used as the solvent.

The organopolysiloxanes of average compositional formula (1) have both functional groups, a (meth)acryl group and a polyoxyethylene group in a molecule. They are thus well compatible with organic resins such as epoxy resins, acryl resins, and urethane resins and impart heat resistance, weather resistance, lubricity, moldability and water solubility to these resins. More particularly, since the organopolysiloxanes of formula (1) have both a radically polymerizable (meth)acryl group and a hydrophilic polyoxyethylene group in a molecule, not only they are readily emulsion polymerizable with other radically polymerizable monomers, but the resulting siloxane grafted resins are crosslinkable with melamine compounds or isocyanate compounds. The terminal end of the polyoxyethylene group can be reacted with an acid anhydride for converting into a carboxyl group, which can, in turn, be neutralized with an amine to form an anionic water-soluble resin.

By effecting radical copolymerization of the acryl or methacryl group of the organopolysiloxane of formula (1) alone or with another polymerizable monomer, there can be obtained a polyether-containing siloxane grafted acryl polymer which has been difficult to synthesize. Additionally, the organopolysiloxane of formula (1) is substantially improved in compatibility with organic resins by incorporating a diphenylsiloxane or phenylmethylsiloxane unit therein.

Therefore, the organopolysiloxanes of formula (1) are useful modifiers for organic resins.

EXAMPLE

Examples of the present invention are given below by way of illustration and not by way of limitation.

EXAMPLE 1

A flask was charged with 200 g of isopropyl alcohol, 220 g of an unsaturated compound containing a polyoxyethylene group: $CH_2=CHCH_2O(CH_2CH_2O)_9H$ (Uniox A-450 commercially available from NOF Corporation), 200 g of an organohydrogenpolysiloxane of the following average compositional formula (A), 0.1 g of a toluene solution of a neutral platinum catalyst having 1,3-divinyltetramethyldisiloxane coordinated therewith (Pt content 0.5 wt %), and 0.05 g of 2,6-di-t-butyl-4-methylphenol.

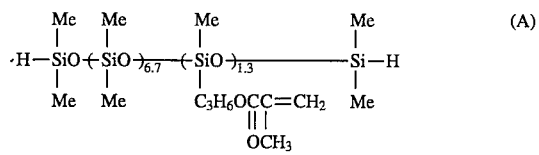

Addition reaction was effected at 75° C. for 6 hours. Distillation at 75° C. and 10 mmHg to remove the low-boiling matter such as isopropyl alcohol was followed by filtration, yielding 410 g of an addition product of formula (A) wherein the Si—H group was converted into a Si—$CH_2CH_2CH_2O(CH_2CH_2O)_9H$ group as a lightly yellow clear liquid.

The product was measured for physical properties, by which it was identified to have the following average compositional formula.

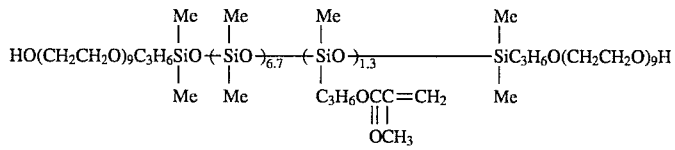

Viscosity: 85.5 centipoise (25° C.)
Refractive index: 1.4496 (25° C.)
Elemental analysis
 FoundC: 47.4% H: 9.0%
 Calcd. C: 47.1% H: 8.8%

| $^1$H-NMR (acetone, $\delta$ = 2.0 ppm standard) | |
|---|---|
| 0.03 | 56H |
| 0.30–0.76 | 7H |
| 1.02–1.73 | 13H |
| 1.86 | 4H |
| 3.43 | 72H |
| 3.85–4.12 | 3H |
| 5.95 | 2H |

IR spectrum: FIG. 1

EXAMPLE 2

Addition reaction was effected in the same manner as in Example 1 except that a flask was charged with 200 g of isopropyl alcohol, 170 g of an unsaturated compound containing a polyoxyethylene group: $CH_2$=$CHCH_2O(CH_2CH_2O)_9H$ (Uniox A-450 commercially available from NOF Corporation), and 200 g of an organohydrogenpolysiloxane of the following average compositional formula (B).

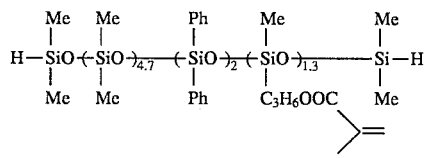

The reaction solution was similarly worked up, yielding 361 g of an addition product as a lightly yellow clear liquid.

The product was measured for physical properties, by which it was identified to have the following average compositional formula.

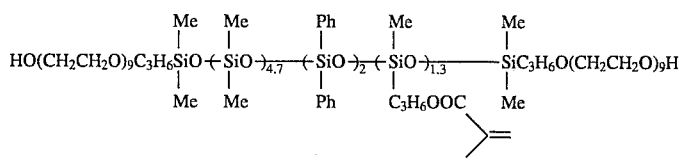

Viscosity: 201 centipoise (25° C.)
Refractive index: 1.4798 (25° C.)
Elemental analysis
 FoundC: 52.1% H: 8.3%
 Calcd. C: 52.6% H: 8.0%

| $^1$H-NMR (acetone, $\delta$ = 2.0 ppm standard) | |
|---|---|
| 0.05 | 44H |
| 0.25–0.76 | 7H |
| 1.00–1.80 | 13H |
| 1.88 | 4H |
| 3.50 | 72H |
| 3.82–4.15 | 3H |
| 5.97 | 2H |
| 6.90–7.54 | 20H |

Figure 2:
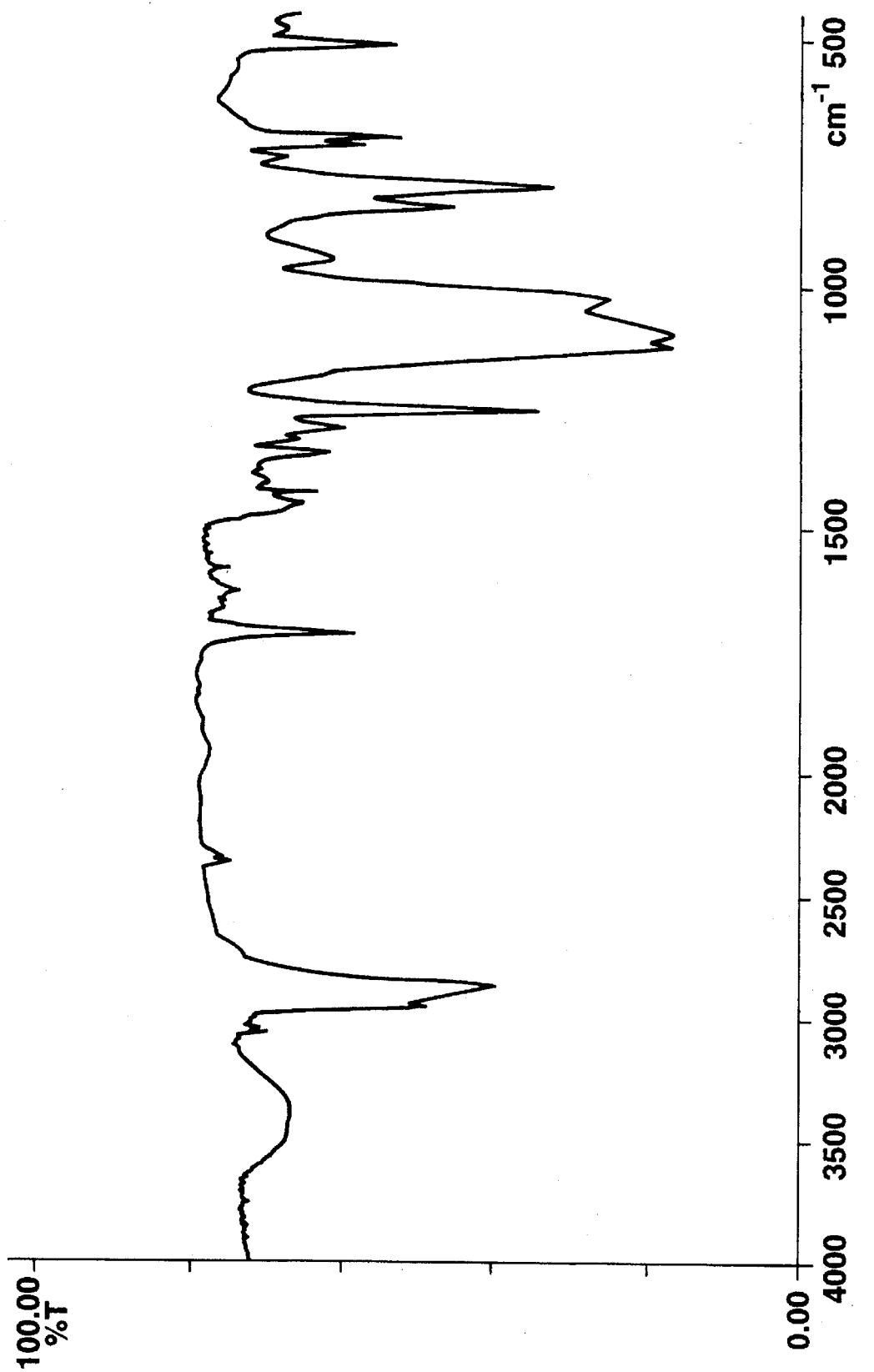
FIG. 2 is an IR spectrum of the organopolysiloxane obtained in Example 2.

IR spectrum: FIG. 2

There have been described organopolysiloxanes of formula (1) which have both a (meth)acryl group and a polyoxyethylene group in a molecule. They are thus well compatible with organic resins. By copolymerizing the (meth)acryl group with another radically polymerizable monomer, the polysiloxane can be introduced into a resin while the polyoxyethylene group imparts lubricity, water solubility and stain resistance. Emulsion polymerization can be done without assistance of an emulsifier. The preparation process of the invention ensures easy synthesis of the organopolysiloxanes in high yields.

Japanese Patent Application No. 151448/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:
1. An organopolysiloxane of the following average compositional formula (1):

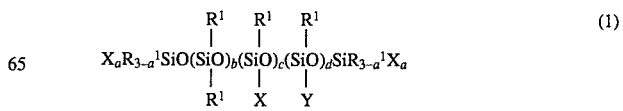

wherein X is —$C_3H_6O(CH_2CH_2O)_nR^2$ wherein $R^2$ is a hydrogen atom or an alkyl group having 1 to 6 carbon atoms and letter n is a positive number of 5 to 30, Y is a 3-acryloxypropyl or 3-methacryloxypropyl group, $R^1$ is an alkyl group having 1 to 6 carbon atoms or phenyl group, letters a, b, c, and d are positive numbers in the range: $a=1, 1 \leq b \leq 20, 0 \leq c \leq 10, 1 \leq d \leq 10$, and $1 \leq a+c \leq 10$.

2. A process for preparing an organopolysiloxane of the following average compositional formula (1):

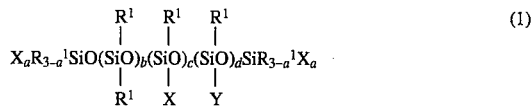

wherein X is —$C_3H_6O(CH_2CH_2O)_nR^2$ wherein $R^2$ is a hydrogen atom or an alkyl group having 1 to 6 carbon atoms and letter n is a positive number of 5 to 30, Y is a 3-acryloxypropyl or 3-methacryloxypropyl group, $R^1$ is an alkyl group having 1 to 6 carbon atoms or phenyl group, letters a, b, c and d are positive numbers in the range: $a=0$ or $1, 1 \leq b \leq 20, 0 \leq c \leq 10, 1 \leq d \leq 10$, and $1 \leq a+c \leq 10$, said process comprising the step of adding an aliphatic unsaturated compound containing a polyoxyethylene group to a Si—H group of an organohydrogenpolysiloxane of the following average compositional formula (2):

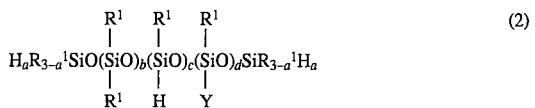

wherein $R^1$, Y, a, b, c and d are as defined above.

3. The process of claim 2 wherein said aliphatic unsaturated compound containing a polyoxyethylene group has the following formula (3):

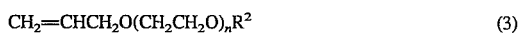

wherein $R^2$ is a hydrogen atom or an alkyl group having 1 to 6 carbon atoms and letter n is a positive number of 5 to 30.

* * * * *